United States Patent [19]

Sato et al.

[11] 3,869,367

[45] Mar. 4, 1975

[54] PROCESS FOR MANUFACTURING A CONDUCTIVE FILM FOR A THIN FILM INTEGRATED CIRCUIT DEVICE

[75] Inventors: Akio Sato; Shigehiko Sato, both of Tokyo, Japan

[73] Assignee: Nippon Electric Company Limited, Tokyo, Japan

[22] Filed: Jan. 3, 1973

[21] Appl. No.: 320,706

[30] Foreign Application Priority Data

Dec. 27, 1972 Japan .......................... 47-130072

[52] U.S. Cl. ........................................ 204/192

[51] Int. Cl. ........................................ C23c 15/00

[58] Field of Search ................................ 204/192

[56] References Cited

UNITED STATES PATENTS

| | | | |
|---|---|---|---|
| 2,993,266 | 7/1961 | Berry | 204/192 |
| 3,275,915 | 9/1966 | Harendza-Harinxma | 204/192 |
| 3,641,402 | 2/1972 | Revitz et al. | 204/192 |

*Primary Examiner*—John H. Mack

*Assistant Examiner*—Wayne A. Langel

*Attorney, Agent, or Firm*—Hopgood, Calimafde, Kalil, Blaustein & Lieberman

[57] ABSTRACT

A low specific resistive conductive thin film for a thin film integrated circuit includes a high conductivity metal film formed on an insulating base plate. An insulator film is formed over that metal film. A metal succeptible to being anodically oxidized is formed over the insulator film and penetrates through fine pores in the insulator film to make electrical contact with the first-mentioned metal film.

3 Claims, 20 Drawing Figures

Figure 1:
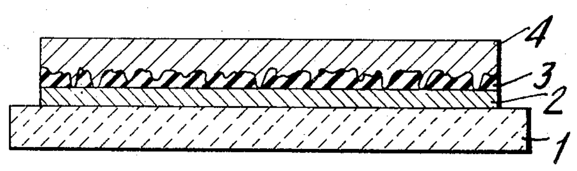

PROCESS FOR MANUFACTURING A CONDUCTIVE FILM FOR A THIN FILM INTEGRATED CIRCUIT DEVICE

This invention relates to a conductive film for a thin film integrated circuit device and a process for manufacturing the same.

Metals such as tantalum and niobium have been widely used as resistor films, because of their high specific resistance, low temperature coefficient durability and stability. These metals are also suited for use as thin film capacitors, because their oxide films form dielectric bodies of high electrical stability. Since resistors as well as capacitors can be formed of the same one of these metals, they are widely used for the formation of the circuit elements of thin film integrated circuit devices. Tantalum, in particular, in the form of a thin film and an oxide, is excellent compared with other metals in terms of its physical and chemical properties, and thus finds a broad application.

To prepare a resistor from a tantalum film, a film of about 1000 A in thickness is usually employed in order to achieve stability and to facilitate manufacturing. A tantalum film having a thickness in this range has a sheet resistivity of 30 – 40Ω/square. Therefore, the anodic oxidation technique is applicable to the film surface for achieving a fine adjustment of the resistance within the range of resistance of from several ohms to several tens of ohms. However, in the range lower than several ohms, the anodic oxidation technique cannot be adopted. On the other hand, a tantalum film resistor is usually not formed by itself in a thin film integrated circuit device. Rather, it is usually formed on a base plate in common with a thin film electron circuit having a capacitor and the like. In this case, the resistance inherent to a tantalum film adversely affects circuit elements other than the resistor. In other words, a tantalum film of a very low specific resistance is desirable for the manufacture of thin film integrated circuit devices.

Tantalum nitride is usually employed in the formation of thin film resistors. However, since tantalum nitride has a specific resistance of about 250 microohm -cm, the thickness and the width of tantalum nitride should be great and the distance between electrodes should be short to obtain a film having a low specific resistance. However, if the preparation of a film resistor having a resistance of approximately 1 ohm is desired, the distance between the electrodes is too small and when the resistance is trimmed by anodic oxidation, the electrolyte comes in contact with the electrode, with the result that anodic oxidation becomes impossible. Further, such a film of low resistance, even if formed properly, will lack adjustability of resistance.

In a film capacitor, the resistance of a tantalum film constituting the electrode is one of the factors affecting the characteristics, especially the Q characteristic, of the capacitor at high frequencies. Therefore, various attempts have heretofore been made to reduce the resistance of the tantalum film. For instance, in one attempt to reduce the resistance of the film the thickness of the tantalum film has been increased as much as possible, usually up to several thousand angstrom. Even when this is done, the inherent film resistance of several ohms cannot be avoided; this resistance is inserted in series with the capacitance resulting in the deterioration of the Q characteristic. Thus, the trimming or fine adjustment of the film thickness is not sufficient to reduce the resistance of the tantalum film.

Gold or gold-plated conductors formed on the substrate metal with excellent adhesiveness to a ceramic base plate, such as chromium, nichrome or titanium, has heretofore been employed as the lead wires of a thin film integrated circuit device. The lead wire is, however, composed of a metal other than the metal of the resistor or capacitor, and therefore, the manufacturing steps are complicated. Furthermore, the problem of the need for expensive gold and the increase of the resistance by the diffusion of copper into gold are unavoidable. Therefore, in the manufacture of thin film integrated circuit devices, the circuit elements such as resistors and capacitors and lead wires should be composed of the same metal material to achieve economic operation and high reliability.

On page 1454 of "Proceedings Of The IEEE," December, 1964, an arrangement of tantalum disposed on aluminum stripes is proposed. However, when a tantalum coating is formed on aluminum by a sputtering process, the tantalum and aluminum are diffused into each other to form a diffusion layer having a high resistance. This makes it impossible to form a film resistor having a sufficiently low resistance. Moreover, an oxide film formed through the anodic oxidation of the tantalum film on aluminum has a poor dielectric characteristics as a result of the diffusion of the aluminum into the tantalum. Therefore, aluminum is not suitable for a lower electrode of a tantalum film capacitor.

A primary object of this invention is to provide a thin film integrated circuit device having a very low specific resistance and a process for manufacturing such film.

In accordance with this invention, there is provided a thin film for a thin film integrated circuit device, which comprises an insulator base plate, a first metal layer of a good conductivity forming a coating on the insulator base plate, a thin insulator film coating formed on the first metal layer, and a second metal layer formed on the insulator film coating and penetrating through the insulator film coating to come into electrical contact with the first metal layer. The second metal layer is composed of a metal that is susceptible to anodic oxidation, such as tantalum, titanium, niobium, and hafnium or an alloy thereof.

In another aspect of this invention, there is provided a process for manufacturing a thin film for a thin film integrated circuit device, which comprises the steps of forming a first metal layer of a good conductivity on an insulator base plate, forming a thin insulator film coating on the first metal layer, and forming a second metal layer of a metal susceptible to anodic oxidation, such as tantalum, titanium, niobium and hafnium or an alloy thereof on the insulator film by sputtering, so that particles of the metal of the second metal layer may penetrate through the insulator film coating to provide an electrical contact with the first metal layer.

In the thin film of this invention, the second metal is in electrical contact with the first metal layer at numerous points through the insulator film, thereby creating a sufficiently low specific resistance. Furthermore, the intermediate thin insulator film prevents undesired diffusion between the metal layers. Therefore, no alloys of the metal layers are formed between the layers. Further, since alloys are not formed, the dielectric properties of the oxide of the second metal layer are not adversely affected. The resistor, capacitor and lead wires can thus be composed of the same metal.

Figure 2:
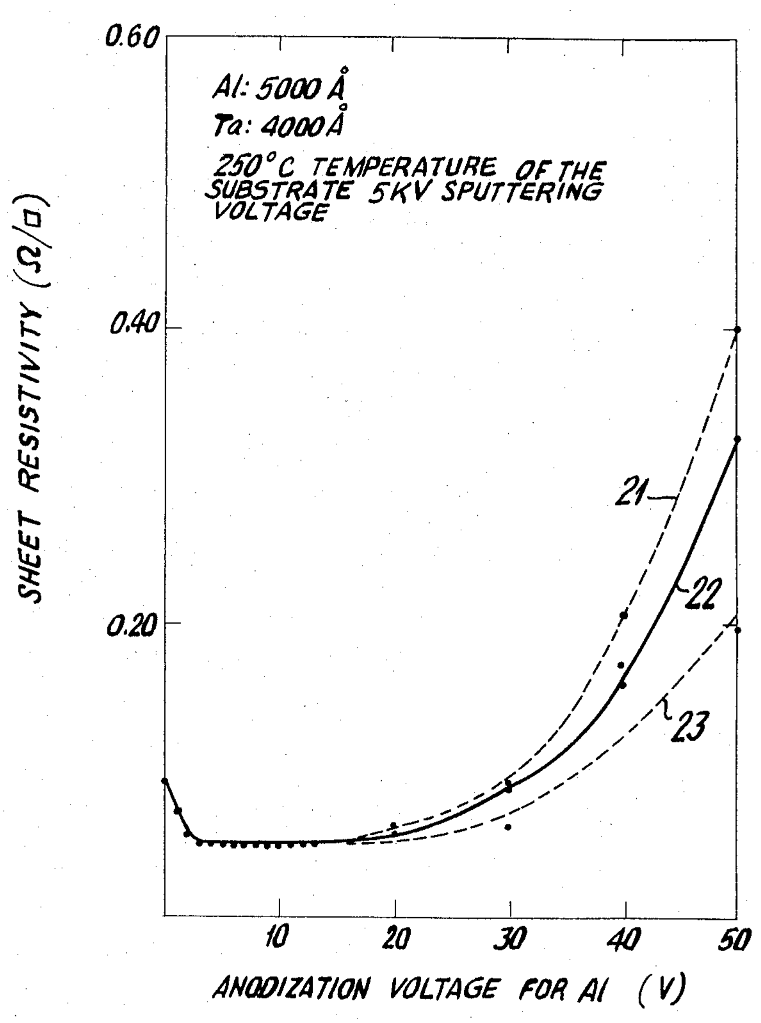
Figure 3:
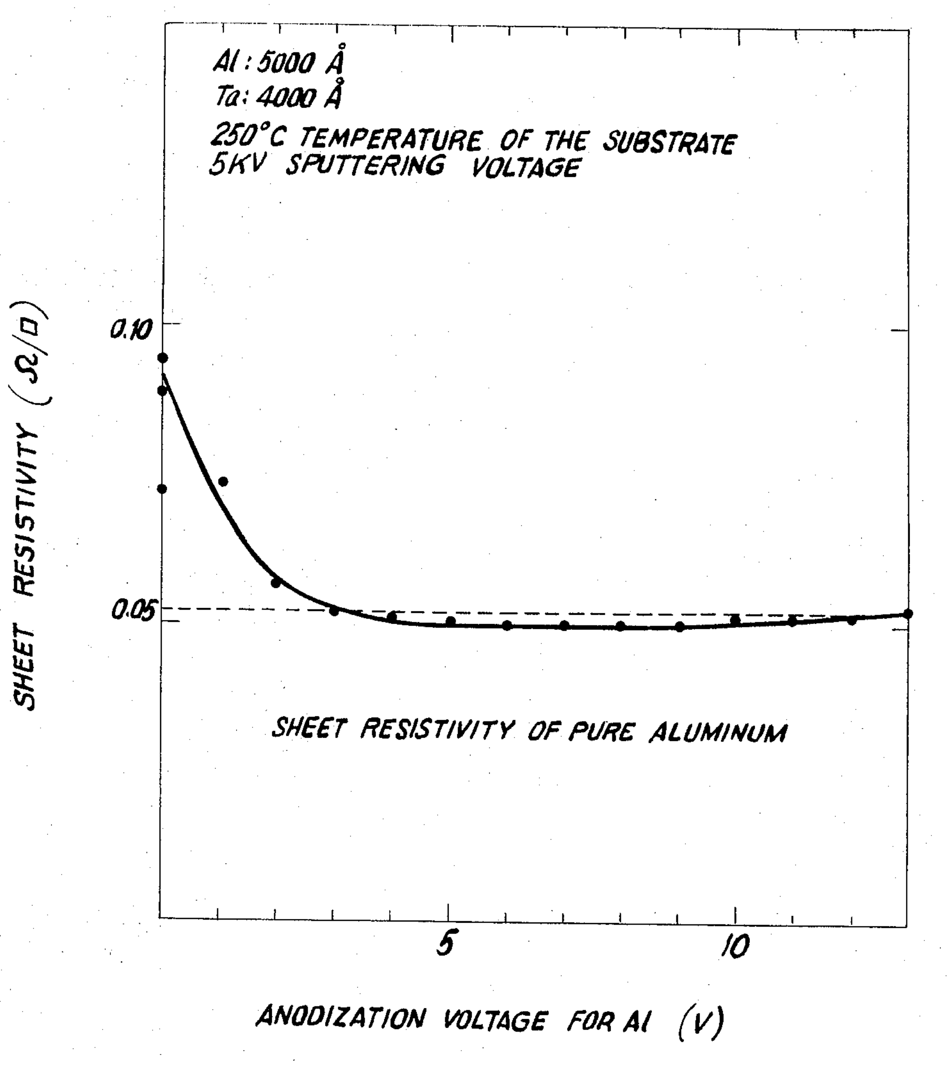

The objects, features and advantages of the present invention will be better understood from the following detailed description taken in conjunction with the accompanying drawings wherein:

FIG. 1 is a cross-section of the thin film of this invention;

FIGS. 2 and 3 diagrammatically show the relation between the thickness of the insulator film, which is in proportion to the voltage applied in the aluminum anodic oxidation process, and the sheet resistivity;

FIGS. 4*a* to 4*g* and 5*a* to 5*e* are cross-sectional views illustrating the steps of the process for manufacturing a thin film capacitor according to this invention; and FIGS. 6*a* to 6*e* are cross-sectional views illustrating steps of the process for preparing a thin film resistor according to this invention.

Referring now to FIG. 1, a metal layer 2 of good conductivity, such as an aluminum layer, is formed through evaporation on a ceramic base plate 1, and an insulator coating 3 formed through the anodic oxidation of the layer 2 or composed of an insulator substance such as silicon dioxide is formed on the metal layer 2. A layer 4 formed of a metal susceptible to anodic oxidation, such as tantalum, titanium, niobium, hafnium, or an alloy of any of these metals, is formed on the insulator coating 3 through a sputtering process. Particles of the metal of the layer 4 penetrate through the insulating coating 3 at numerous points at the time of sputtering to provide an electrical contact with the conductive metal layer 2. According to this structure, the sheet resistivity can be reduced to a value lower than that of the high conductivity metal constituting the layer 2. Aluminum, whose specific resistance is comparable to that of tantalum, and which has an excellent adhesiveness to the ceramic base plate, is suitable as the metal constituting the layer 2. In this embodiment, the layer 2 is formed of aluminum and the metal layer 4 is made of tantalum. As mentioned above aluminum and tantalum are easily diffused into each other to form an alloy of high resistance. However, in accordance with this invention, the insulator film coating 3 acts as an intermediate layer preventing the formation of the highly resistive alloy of tantalum and aluminum. The insulator film coating 3 is so thin that the sputtered tantalum from layer 4 penetrates physically through the insulator coating 3 to form numerous electrical contacts with the lower aluminum layer 2. However, if the insulator coating 3 is too thin, high-resistance is formed, because of the fact that the sputtered tantalum holds a high kinetic energy after the tantalum penetrates through the film coating 3. In contrast, when the thickness of film coating 3 is too large, tantalum of layer 4 fails to penetrate through the insulator coating 3 to make it impossible to form a sufficient number of electrical contacts with the lower aluminum layer 2. The energy necessary for the tantalum of layer 4 to penetrate through the insulator coating 3 to form sufficient electrical contacts with the lower aluminum layer 2 varies dependng on the temperature of the ceramic base plate 1, the sputtering voltage and other factors. Therefore, the thickness of the insulating film coating should be chosen to meet these conditions.

The curves shown in FIG. 2 are for the embodiment in which aluminum is used for the layer 2 of FIG. 1 and a film formed by the anodic oxidation of the aluminum layer 2 is used as the insulaton coating 3. More specifically, the curves illustrate the relation between the thickness of the aluminum oxide insulator coating 3, which depends on the anodic oxidation voltage, and the sheet resistivity of the thin film. The upper limit values of sheet resistivity are plotted on the broken-line curve 21 as a function of the change in the anodization voltage. The lower limit values and average values are plotted in like manner in the form of curves 23 and 22, respectively.

In the embodiment of FIG. 1, the lower aluminum layer 2 has a thickness of approximately 5000 A and the tantalum layer 4 has a thickness of approximately 4000 A. Tantalum is sputtered under a cathode-anode potential of 5000V at a base plate temperature of 250°C. As is seen from FIG. 2, when the anodic oxidation voltage is zero, namely when no aluminum oxide layer is formed, the sheet resistivity is 0.95Ω/square, which is equal to that of the known tantalum-aluminum alloy layer. With an increase of the anodic oxidation voltage, however, the sheet resistivity abruptly decreases. Within the range of 3 – 12V of the anodization voltage, corresponding to a film thickness range of 50 – 190 A, the sheet resistivity is lower than that of pure aluminum, i.e., 0.05 ohm/cm$^2$. When the anodic oxidation voltage increases beyond the low range and reaches the range from 20 to 50V, corresponding to a film thickness range of 320 – 800 A, an abrupt increase of the sheet resistivity approximately a quadratic curve is observed. This abrupt increase of the sheet resistivity in this region of film thickness is probably a result of the fact that the increase of the thickness of the aluminum oxide coating 3 results in an abrupt decrease in the number of electric contacts connecting the sputtered tantalum layer and the lower aluminum layer. The upper limit values of the insulator coating 3 to be plotted on the extension of the curve 21 corresponding to the anodic oxidation voltage beyond 50 volts depend on the thickness at which the sputtered metal ceases to penetrate through the insulator coating 3. That upper limit is about 2200 A. The observed data have proved that when aluminum oxide coating 3 is given an appropriate thickness, a significant reduction of the sheet resistivity of the tantalum film can be attained.

FIG. 3, which is a partially enlarged view of FIG. 2, is explains more specifically the effect attained by appropriately adjusting the thickness of the aluminum oxide layer. From the experimental results shown in FIG. 3, it will readily be understood that when the aluminum oxide coating 3 has a thickness corresponding to an anodic oxidation voltage ranging from 5 to 10V, the diffusion between the upper tantalum layer 4 and the lower aluminum layer 2 is effectively prevented, and both the layers are in adequate electrical contact with each other, whereby the sheet resistivity of the thin film can be made lower than that of a conventional thin film. The dotted line shows the sheet resistivity of pure aluminum.

This invention will now be illustrated more specifically by reference to the following Examples.

EXAMPLE 1

Figure 4A:
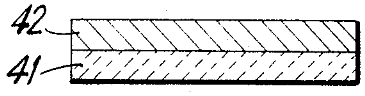
Figure 4B:
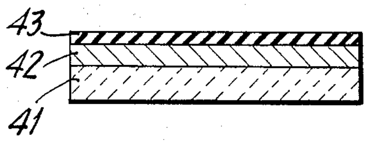
Figure 4C:
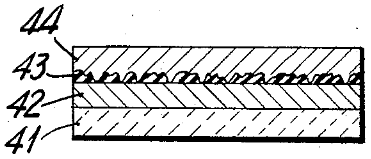
Figure 4D:
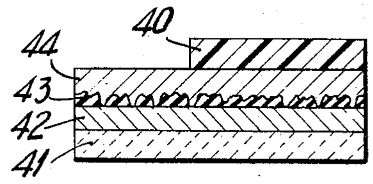
Figure 4E:
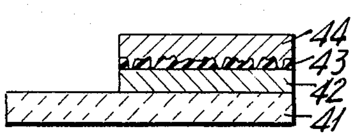
Figure 4F:
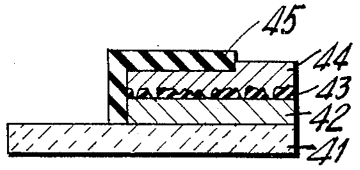
Figure 4G:
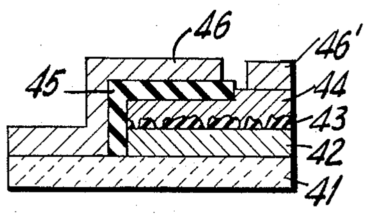

An aluminum film 42 having a thickness of about 5000 A is evaporated onto a base plate 41 (FIG. 4*a*). The anodic oxidation is carried out at a voltage of 10V to convert the surface layer of the aluminum film 42 into an aluminum oxide layer 43 having a thickness of 160 A (FIG. 4b). Then, metallic tantalum is sputtered onto the aluminum oxide layer 43 in an argon atmosphere under a cathode-anode potential of 5.0 KV to form a tantalum film layer 44 having a thickness of about 5000 A (FIG. 4c). A film 40 of an anti-etching substance such as photoresist is formed on the tantalum film layer 44 (FIG. 4d). The aluminum film 42, the aluminum oxide layer 43, and the tantalum film layer 44 are then respectively etched, and the anti-etching film 40 is removed (FIG. 4e). An anti-oxidation film is covered on those parts other than the region to be converted to an oxide film acting as a dielectric of the capacitor (not shown), anodic oxidation is carried out at a voltage of about 250V to form an oxide dielectric layer 45, and the anti-oxidation film is then removed (FIG. 4f). Electrode metals 46 and 46′ are evaporated on the oxide dielectric layer 45 and the tantalum film layer 44. Electrode metals 46 and 46′ have a double layer structure composed of a layer of an adhesive metal, such as chromium, nichrome or titanium, and an upper layer of a metal suitable for soldering or bonding with an external element, such as gold or copper.

A capacitor of about 10,000 pf prepared in this manner has a loss of only about 1 percent in a high frequency region of about 500 kHz. When the lower aluminum layer 42 is not formed, or when the aluminum oxide layer 43 is not formed while the lower aluminum layer is formed, the loss of the resulting capacitor at high frequencies is much greater than that of a capacitor prepared according to this invention even if the same pattern is employed. For instance, a capacitor having no lower aluminum layer has a 1 percent loss at 1.0 KHz, and a capacitor having a lower aluminum layer 42 but having no aluminum oxide layer, has a 1 percent loss at 100 kHz. As can be seen from the foregoing, the remarkable improvement in the high frequency characteristics of a capacitor fabricated according to this invention is a result of the fact that the resistance of the lower electrode can be reduced to a level almost equal to that of aluminum and a good dielectric layer is formed without the formation of an aluminum-diffused layer on the surface of the tantalum film.

EXAMPLE 2

Figure 5A:
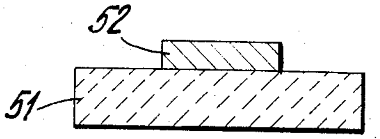
Figure 5B:
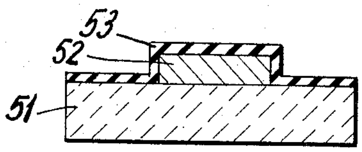
Figure 6B:
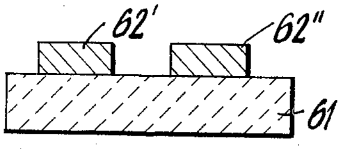
Figure 5C:
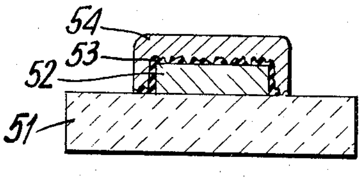

An aluminum film 52 having a thickness of about 5000 A is formed on a ceramic base plate 51 by electron beam evaporation, and the aluminum film 52 is etched to provide a desired form by a photo-etching method (FIG. 5a). Then, a silicon dioxide film 53 having a thickness of about 1000 A is formed on the aluminum film 52 by a high frequency sputtering method (FIG. 5b). Then, β-tantalum is sputtered under a cathode-anode potential of 5.0 KV onto the silicon dioxide film 53 to form a β-tantalum film 54 having a thickness of about 5000 A. It is then etched to provide a desired pattern by a photo-etching method (FIG. 5c). At this time, the sheet resistivity of the thin film composed of the β-tantalum film 54, the silicon dioxide film 53, and the aluminum film 52 is almost equal to that of the aluminum film 52, i.e., approx. 0.05 ohm/cm$^2$.

Figure 5D:
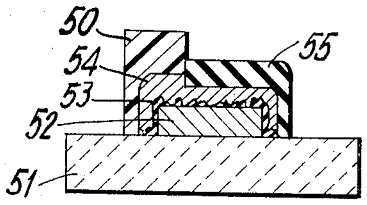
Figure 5E:
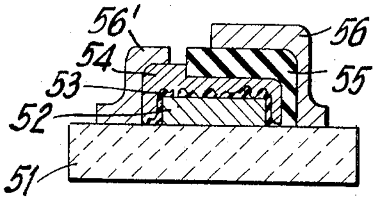

A photoresist coating 50 of a desired form is formed on the β-tantalum film 54 and the assembly is dipped in an aqueous solution of citric acid to effect the anodic oxidation and convert the surface of the β-tantalum film 54 at those parts that are free of the photoresist coating 50 into an oxide film 55 (FIG. 5d). Then, the photoresist coating 50 is removed, and a nichrome layer and a gold layer are evaporated on the β-tantalum film 54 and the oxide film 55. The double layer of the nichrome and gold is arranged to have a thickness of about 3000 A. The double layer is etched to provide a desired pattern by a photo-etching method, to thereby form electrodes 56 and 56′, and complete the fabrication of a thin film capacitor (FIG. 5e).

In this Example, the metal of the lower layer 52 is not limited to aluminum. Similar results can be obtained by employing a layer of any other metal having a good conductivity, for instance, a gold film. Of course, when a metal not susceptible to anodic oxidation, such as palladium, platinum or gold is employed, in order to prevent the passage of a leakage current through the lower metal layer 52 during the anodic oxidation of the β-tantalum film 54, it is necessary to completely cover the periphery of the lower metal layer 52 with the β-tantalum film 54 as shown in FIG. 5d or with an insulating material.

The intended effects of this invention can be attained by adjusting the thickness of the silicon dioxide film 53 in the range between approximately 200 A and about 5000 A. The thickness of the silicon dioxide film 53 is preferably in the range of 300 A to 3000 A. Other films of appropriate insulating substance, such as silicon monooxide film and yttrium oxide film, formed by evaporation or sputtering may be employed in place of the silicon dioxide film 53.

EXAMPLE 3

The preparation of a thin film resistor according to this invention is illustrated by reference to FIGS. 6a to 6e.

Figure 6A:
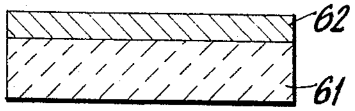
Figure 6C:
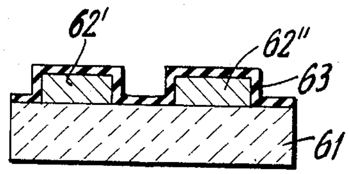
Figure 6D:
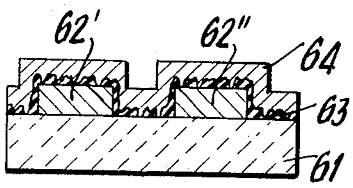
Figure 6E:
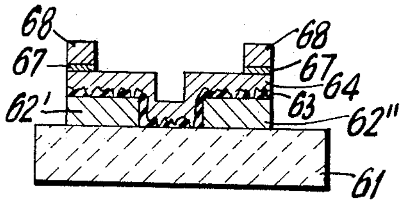

An aluminum film 62 having a thickness of 5000 A is formed on a ceramic base plate 61 by electron beam evaporation (FIG. 6a). Films 62′ and 62″ spaced from each other by a distance of 50 microns and having a confronting face length of 1 mm are formed by a photo-etching method performed on film 62. A silicon dioxide film 63 having a thickness of about 1000 A is then formed to completely cover the aluminum films 62′ and 62″ and the ceramic base plate 61 (FIG. 6c). Then, tantalum is sputtered on the silicon dioxide film 63 in an atmosphere of nitrogen and argon to form a tantalum nitride film 64 having a thickness of about 4000 A on the silicon dioxide film 63 (FIG. 6d). At this time, particles of tantalum nitride penetrate through the silicon dioxide film 63 at numerous points to provide an electrical contact with the aluminum films 62′ and 62″. The sheet resistivity of the resulting structure on the aluminum films 62′ and 62″ is about 0.05 ohm/cm$^2$. Then, nichrome 67 and gold 68 are successively evaporated on the tantalum nitride film 64, and nichrome 67 and gold 68 are successively etched by a photo-etching method to form electrodes. The distance between the electrodes should be at least 40 microns to facilitate the resistance adjustment carried out by a subsequently performed anodic oxidation step. The tantalum nitride film 64 and the silicon dioxide film 63 are then etched to form a resistor (FIG. 6e). The adjustment of the resistance is accomplished by subjecting the surface of the tantalum nitride film 64 between the aluminum films 62′ and 62″ to anodic oxidation, carried out by applying an electrolyte on the tantalum nitride film 64 disposed between the aluminum films 62′ and 62″, placing an electrode into the electrolyte, and applying a negative voltage to this electrode and a positive voltage to the electrode of the film resistor. The value of the resistance is decided by the resistance of the tantalum nitride 64 between the aluminum films 62' and 62''. Thus, the distance between the electrodes can be freely fixed. If the distance is at least 40 microns, the electrolyte does not come into contact with any of the electrodes of the film resistor as a result of its own surface tension. Therefore, the resistance adjustment can be accomplished even in a resistor having a very low value of resistance. A film resistor fabricated according to this Example had a resistance of 1.5 ohms.

EXAMPLE 4

In this embodiment, a lead wire of this invention is explained with reference to FIG. 1. Aluminum 2 is evaporated on a ceramic substrate plate 1, and a thin insulating film 3 of aluminum oxide or silicon dioxide is formed thereon. Tantalum or tantalum nitride 4 is formed on the insulating film layer 3 by sputtering to obtain electrical contact between the tantalum or tantalum nitride layer and the aluminum layer. At those portions where soldering or wire-bonding is required, a film of a highly adhesive metal, such as chromium, nichrome, or titanium, and a film of a metal having a good soldering or bonding property, such as gold or copper, are successively attached on the tantalum or tantalum nitride layer of the above structure.

This invention has been illustrated by reference to some Examples, but the scope of this invention is not intended to be limited to these Examples. For instance, any metal having a good conductivity such as palladium, platinum, or gold can be used as the lower layer metal instead of aluminum. In the event that a metal not susceptible to anodic oxidation is used as the lower layer metal, as described in Example 2, the lower layer metal should be completely covered by the upper layer metal before the formation of the capacitor dielectric by anodic oxidation. Any insulator can be used for the formation of the insulator film layer, but the thickness of the insulator film layer should be so selected that, at the time of the sputtering of the upper layer metal, the particles of the upper layer metal can penetrate through the insulator film but the sputtering energy will not be reduced to such an extent as to cause the formation of an alloy of the penetrating metal particles with the lower layer metal. The film thickness is determined from a consideration of the properties of the insulator that constitutes the insulating film layer. In the case of aluminum oxide, the thickness of the insulator film layer is selected within a range of from 50 to 2200 A, preferably from 50 to 500 A, and in the case of silicon dioxide formed by the gas phase growth, the thickness of the insulator film layer is selected within a range of from 200 to 5000 A, and preferably from 300 to 3000 A. Further, in view of the fact that a film formed by anodic oxidation has no defect such as pin holes, whereas a film formed by gas phase growth has such defects, the number of the electrical contacts between the upper layer metal and lower layer metal will be greater in a film formed by gas phase growth than in a film formed by anodic oxidation. The metal constituting the upper layer is not limited to tantalum or tantalum nitride, other metals susceptible to anodic oxidation; such as titanium, niobium, and hafnium and alloys containing such metal can be used in a like manner.

Thus, although the invention has been hereinabove described with respect to several embodiments thereof, it will be appreciated that variations may be made therein without necessarily departing from the spirit and scope of the invention.

What is claimed is:

1. A process for manufacturing a highly conductive thin film for use in thin film integrated circuits comprising the steps of:

forming a film of a first high-conductivity metal on an insulator base plate;

forming a diffusion preventing insulator film on said metal film; and sputtering a second metal susceptible to anodic film forming oxidation onto said insulator film, said insulator film being of such a thickness as to permit particles of said second metal to penetrate said insulator film at a multiplicity of locations, while leaving intact a sufficient insulating film to substantially prevent the formation of an alloy of said first and second metals, whereby a composite film is produced having a specific conductivity higher than that of either of said first or said second metals.

2. The process claimed in claim 1, wherein said first metal is aluminum, said insulator film is formed by the anodic oxidation of said first metal, and the thickness of said insulator film is 50 to 2200 A.

3. The process claimed in claim 1, wherein said first metal is aluminum, and said insulator film is silicon dioxide having a thickness of 200 to 5000 A.

* * * * *